United States Patent [19]

Steadman

[11] 3,805,233

[45] Apr. 16, 1974

[54] ERROR CHECKING METHOD AND APPARATUS FOR GROUP OF CONTROL LOGIC UNITS

[75] Inventor: Howard L. Steadman, Menlo Park, Calif.

[73] Assignee: Tymshare, Inc., Cupertino, Calif.

[22] Filed: June 28, 1972

[21] Appl. No.: 267,040

[52] U.S. Cl. .......................................... 340/146.1 AG
[51] Int. Cl. .......................................... G06f 11/10
[58] Field of Search...... 235/153 AP; 340/146.1 AG

[56] References Cited

UNITED STATES PATENTS

| | | | |
|---|---|---|---|
| 3,113,204 | 12/1963 | O'Brien | 235/153 AP |
| 3,221,154 | 11/1965 | Gesek et al. | 340/146.1 AG |
| 3,245,049 | 4/1966 | Sakalay | 340/146.1 AG |
| 3,613,014 | 10/1971 | Moegen | 235/153 AP |
| 3,699,322 | 10/1972 | Dorr | 235/153 AP |

*Primary Examiner*—Charles E. Atkinson
*Attorney, Agent, or Firm*—Flehr, Hohbach, Test, Albritton & Herbert

[57] ABSTRACT

A method and apparatus for error checking control logic, for example, in a sequencer loop where only one binary flip-flop unit of the sequencer may be true at any one time and thus the loop has a constant parity. All of the bistable units are coupled to a parity checking unit and the combined parity is checked for the constant parity.

1 Claim, 4 Drawing Figures

ERROR CHECKING METHOD AND APPARATUS FOR GROUP OF CONTROL LOGIC UNITS

BACKGROUND OF THE INVENTION

The present invention is directed to an error checking method and apparatus for a group of control logic units. More specifically, it is directed to, for example, detecting a malfunction of a sequence of control logic units.

In a control logic sequence the actual hardware has various gate failures, incorrect sampling sequences, and malfunctions due to noise pulses. At the present time this is indicated and/or detected by finding mistakes in the words carried by the data paths of the overall logic system. Where a computer or other logical system has a hardware error which causes a minimum of word errors, in other words, it is an "almost well" machine, it is very difficult to detect an error immediately after it occurs. Another failure mode may cause a control system to travel in two branches of a loop simultaneously. This is also very difficult to detect by present techniques.

OBJECT AND SUMMARY OF THE INVENTION

It is, therefore, an object of the present invention to provide an improved error checking method and apparatus for control logic.

In accordance with the above object there is provided an error checking method for a group of control logic units having binary output signals with a predetermined constant parity when the control logic is properly operating. The method includes the steps of concurrently sensing the binary states of the units, generating the parity of the states, and comparing the generated parity with the predetermined constant parity.

DETAILED DESCRIPTION OF THE PREFERRED EMBODIMENT

Figure 1:
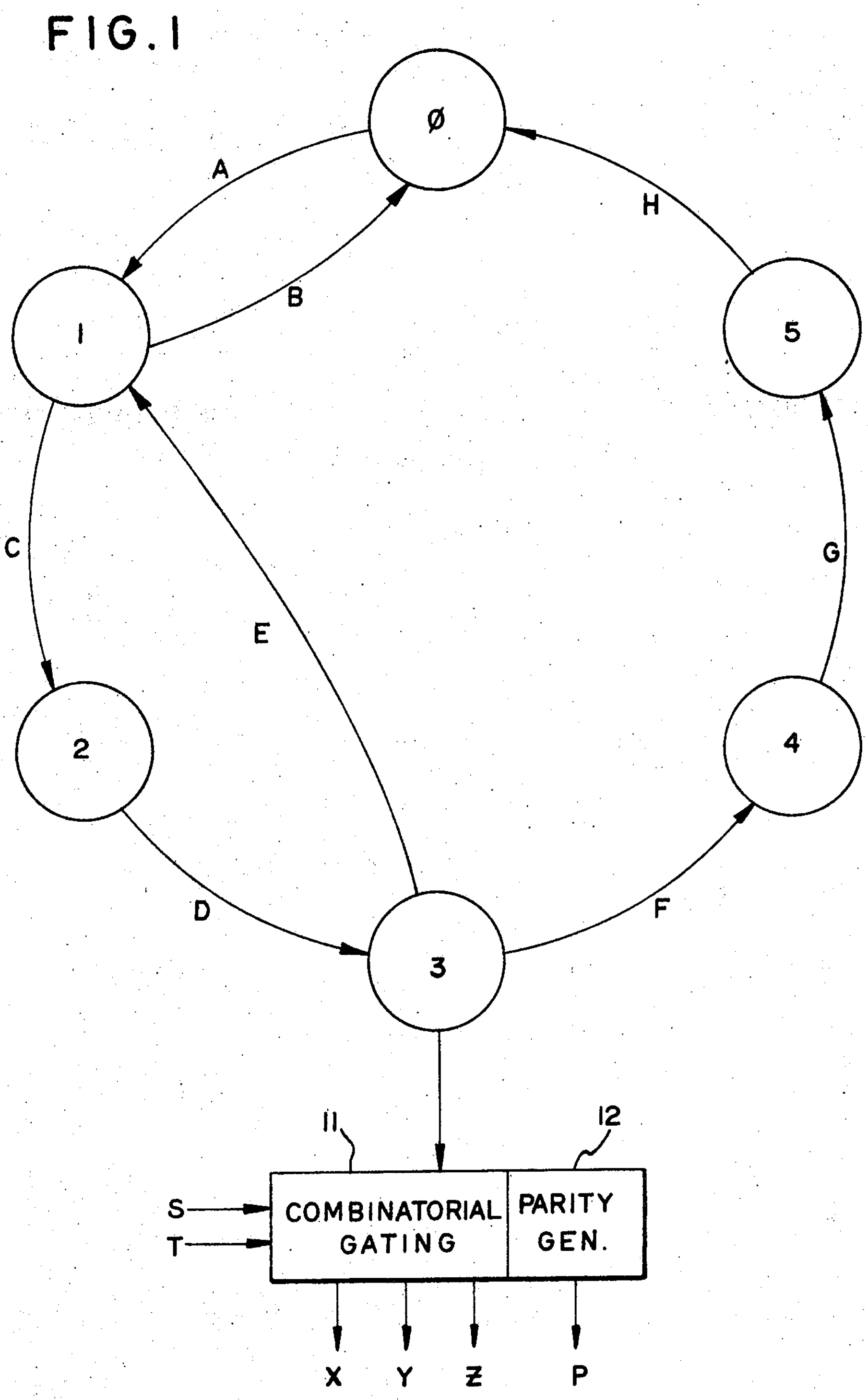
FIG. 1 is a state diagram including combinatorial gating incorporating the present invention.

Referring now to FIG. 1, a state diagram is illustrated where the circles numbered 0 through 5 represent five different states and would most commonly be in the form of bistable units or flip-flops. The transition from one state to another is indicated by the curved lines A through H. This is a closed loop type of state diagram and thus, can be considered a logic sequence. Only one of the state units 0 through 5 is in a true state or condition at any one time. Thus, it may be said that the logic sequence has a constant parity of true or one. If two signals are true at once, parity would be identical to 0 and thus an error would be indicated.

Figures 2, 2A:
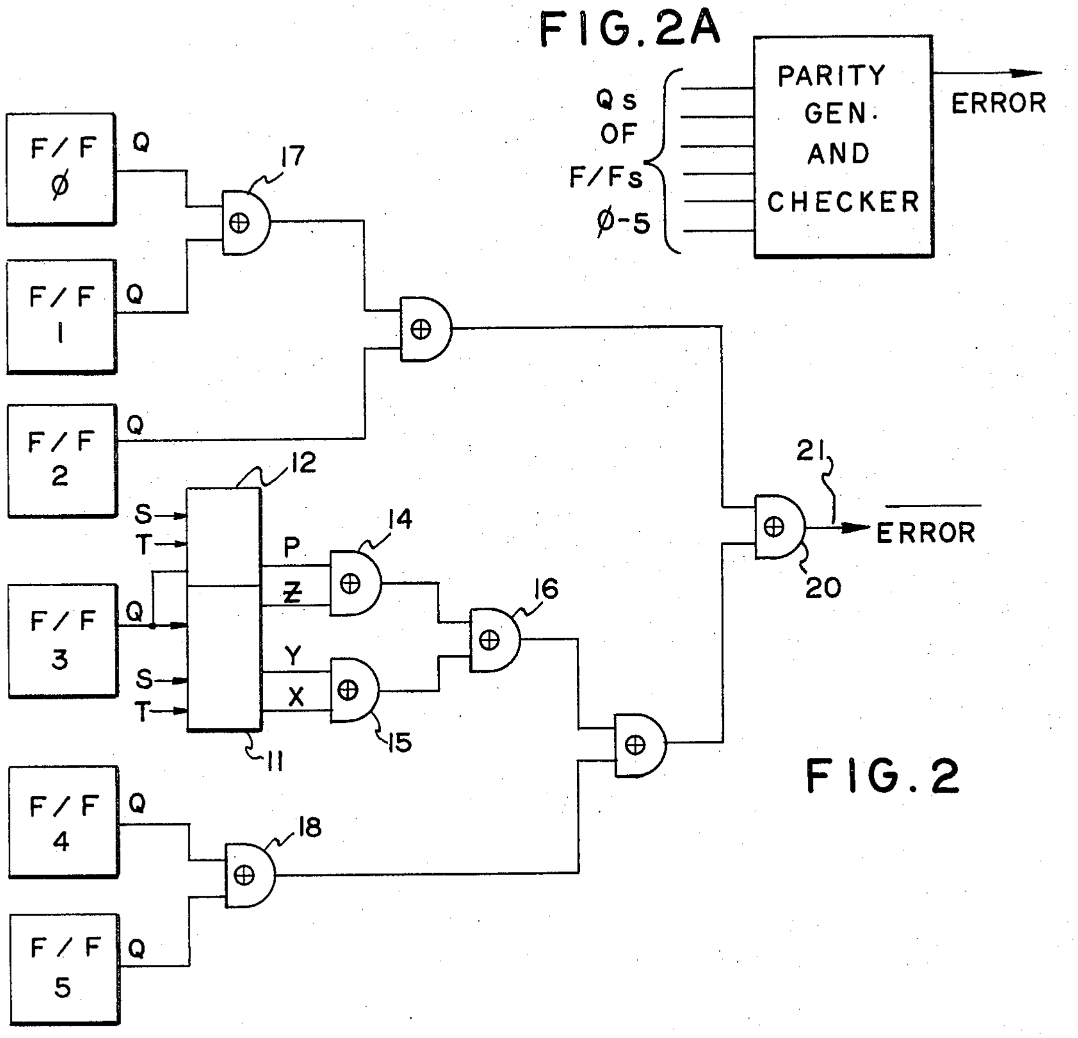
FIG. 2 is a block diagram of error checking apparatus incorporating the present invention and which also corresponds to the state diagram of FIG. 1.
FIG. 2A is a modification of FIG. 2.

Assuming that all of the state devices 0 through 5 are flip-flops, if the Q outputs of these flip-flops are applied to a parity generator and checker as illustrated in FIG. 2A and if the predetermined constant polarity of "one" of the logic sequence has been entered into the checker, then the checker device will compare this predetermined constant parity to the generated parity and produce an error signal as indicated if there is a lack of comparison. Such parity generator and checker unit is commercially available from National Semiconductor Corp. under the model no. DM 8220. The checker itself consists of an array or tree of Exclusive OR gates.

Referring now to both FIGS. 1 and 2 the output of the state 3 device as indicated in both figures is coupled to a combinatorial gating unit 11 which has binary outputs *X*, *Y*, *Z* and other control inputs designated S and T. The combinational gating 11 is such that true or logical 1 outputs are provided on *X*, *Y* or *Z* at any one time by the following equations.

$$X = \bar{S}\,\bar{T}\,3 \quad 1.$$

$$Y = S\,\bar{T}\,3 + \bar{S}\,\bar{T}\,3 = \bar{T}\,3 \quad 2.$$

$$Z = \bar{S}\,T\,3 + S\,\bar{T}\,3 \quad 3.$$

In order to maintain a constant parity in the overall logic system, a combinational logic unit 12 is provided which adds an additional parity bit to maintain this constant parity. Such parity generator 12 is responsive to both the 3 state unit and the *S* and *T* inputs as determined by equation 4.

$$P = \bar{S}\,\bar{T}\,3 + S\,T\,3 + S\,\bar{T}\,3 = \bar{S}\,\bar{T}\,3 + s\,3 \quad 4.$$

The logic unit or parity bit generator 12 thus generates a bit in order that the total combination of the *X*, *Y*, *Z* and parity signals are equivalent to the state 3 binary output signal.

This is implemented in FIG. 2 where the flip-flops 0 through 5 represent the states 0 through 5 with the Q outputs of each flip-flop being coupled into an Exclusive OR gate except for flip-flop 3. Here the Q output is connected to gating unit 11 and unit 12 and the output of those units are coupled into respective Exclusive OR gates 14 and 15 which have their gate outputs coupled into Exclusive OR gate 16. The output of Exclusive OR gate 16 is equivalent to the Q output of the flip-flop 3. However, the combinatorial gating unit 11 is also being tested.

Alternatively, if it is desired to merely check the combinatorial gating 11 by itself, then the parity generator 12 would provide a parity such that the total parity was constant. This would be accomplished by a parity generator which functions in accordance with equation 5.

$$P = \bar{3} + S\,T\,3 + S\,\bar{T}\,3 + \bar{S}\,\bar{T}\,3 = \bar{3} + S\,T\,3 + \bar{T}\,3 \quad 5.$$

Figure 3:
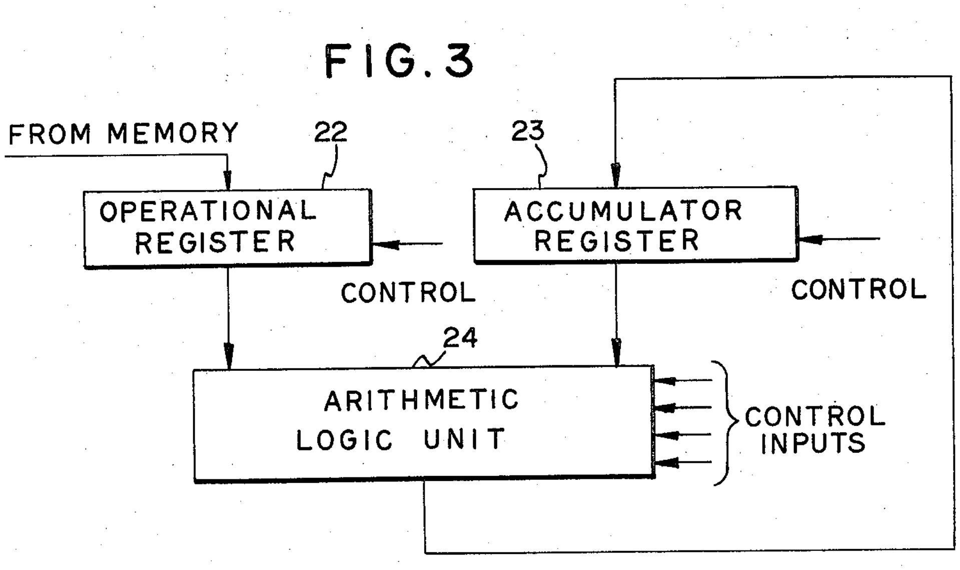
FIG. 3 is a block diagram of a central processing unit illustrating another application of the present invention.

The use of the foregoing constant parity output in a combinatorial gating type situation is especially applicable in the central processor unit (CPU) shown in FIG. 3. Such processor has a number of internal control states with several control signal inputs. In the process of executing an instruction, various ones of these control signals can be true, some simultaneously. If an additional parity signal is added by use of a parity generator as explained above to provide a check bit such that the parity of all the control signals and the check bit is constant then the same situation exists as is true of the six state unit illustrated in FIGS. 1 and 2A.

The CPU illustrated in FIG. 3 consists of an operational register 22, an accumulate register 23 and an arithmetic logic unit 24 all with various control inputs. In the course of performing an instruction such as a load accumulate instruction, data is gated from the memory of the computer (not shown) to the operational register 22. Next, data is gated from this register to the arithmetic logic unit 24 and this unit is instructed to pass data unchanged. Part of the data is gated to accumulator register 23. At each step certain gating control signals are true. If an additional control check bit is generated such that the parity is constant, then at each step the parity can be computed of all control bits. If it is not correct, a malfunction will have been detected by the error signal.

Yet another application of the present invention would be a situation where, for example, a set of three flip-flops would provide for six logical states. Each of these logical states would thus consist of three bits with its own unique parity. With the use of a read only memory the desired parity bit of the combination of flip-flops could be checked with the actual parity bit and an error indicated. Also, illegal states (three flip-flops will provide $2^3$ or eight logical states) can be assigned a wrong parity bit to thus eliminate data in this manner.

Thus, the present invention has provided an improved method and apparatus for the error checking of control logic. I claim:

1. Error checking apparatus for a group of control logic units having binary output signals with a predetermined constant parity when the control logic is properly operating and where one of said logic units drives a combinatorial gating unit having a plurality of output signals said apparatus comprising: parity generator means for providing an output signal which in combination with said plurality of output signals of said combinatorial gating unit provides a parity equivalent to said one logic unit and means for sensing the binary output signals of said remaining logic units, said output signals of said combinatorial gating unit, and said output signal of said parity generator means and for determining the parity of all of said logic signals and indicating an error condition if said determined parity differs from said predetermined parity.

* * * * *